Dec. 15, 1936.   A. B. LEECH   2,064,210
APPARATUS FOR PRODUCING ILLUMINATED MOTION EFFECTS
Filed May 16, 1935   4 Sheets-Sheet 1
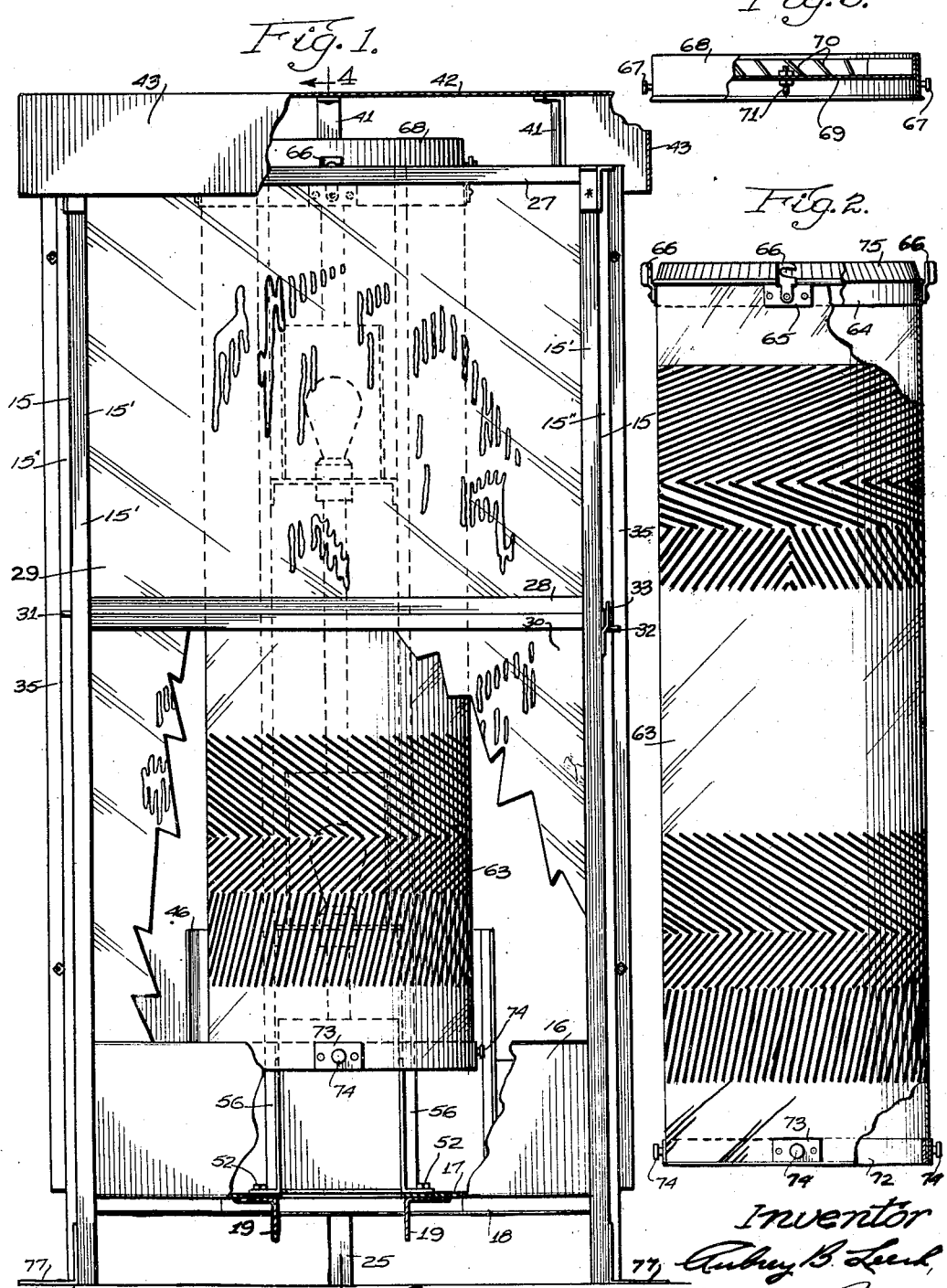

Dec. 15, 1936.    A. B. LEECH    2,064,210
APPARATUS FOR PRODUCING ILLUMINATED MOTION EFFECTS
Filed May 16, 1935    4 Sheets-Sheet 2
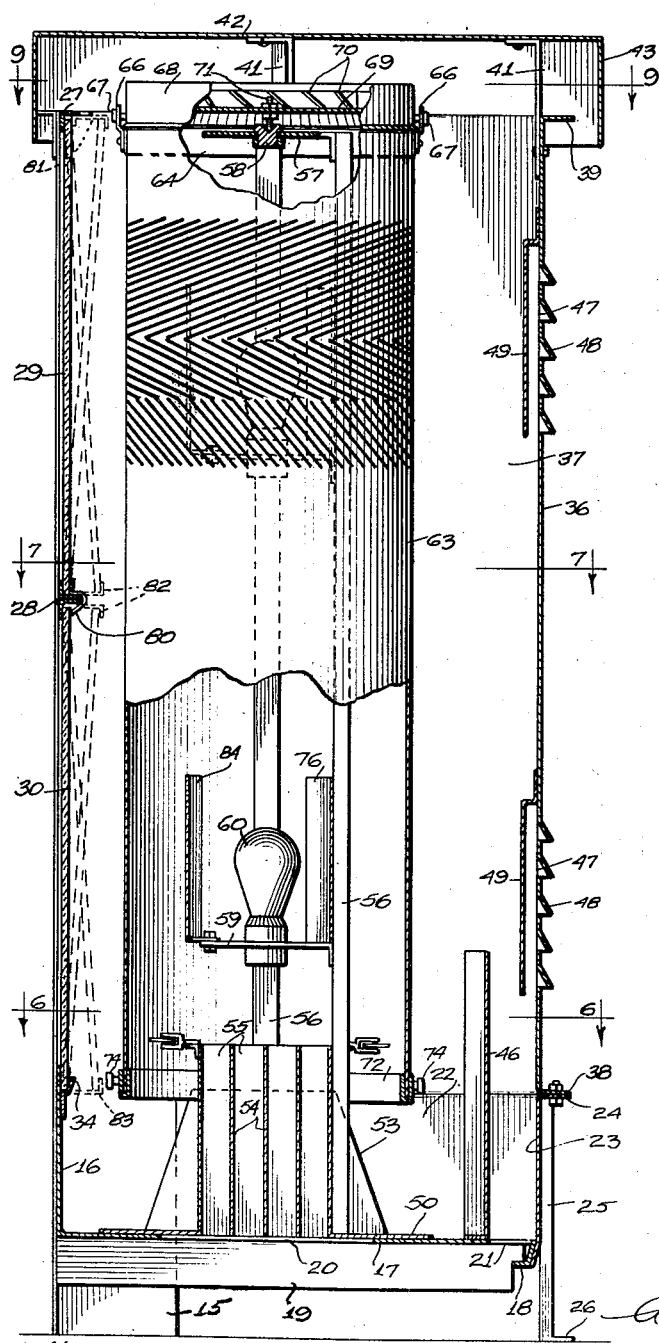
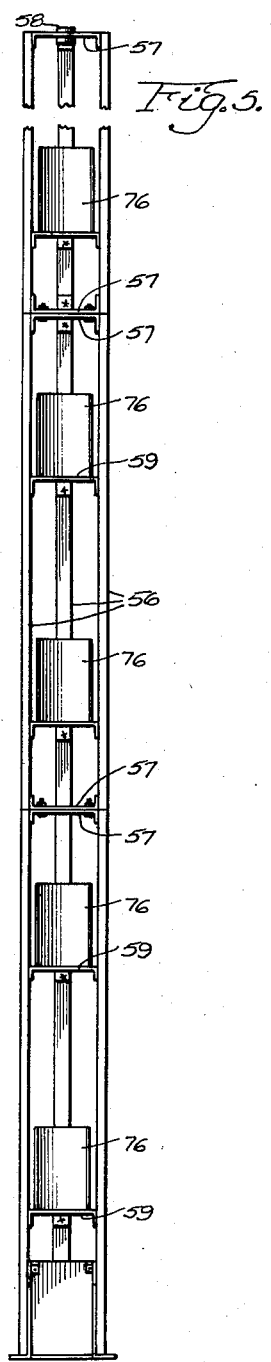
Inventor
Aubrey B. Leech,
By Fisher, Clapp, Soans & Pond
Attys:

Dec. 15, 1936.  A. B. LEECH  2,064,210
APPARATUS FOR PRODUCING ILLUMINATED MOTION EFFECTS
Filed May 16, 1935  4 Sheets-Sheet 3
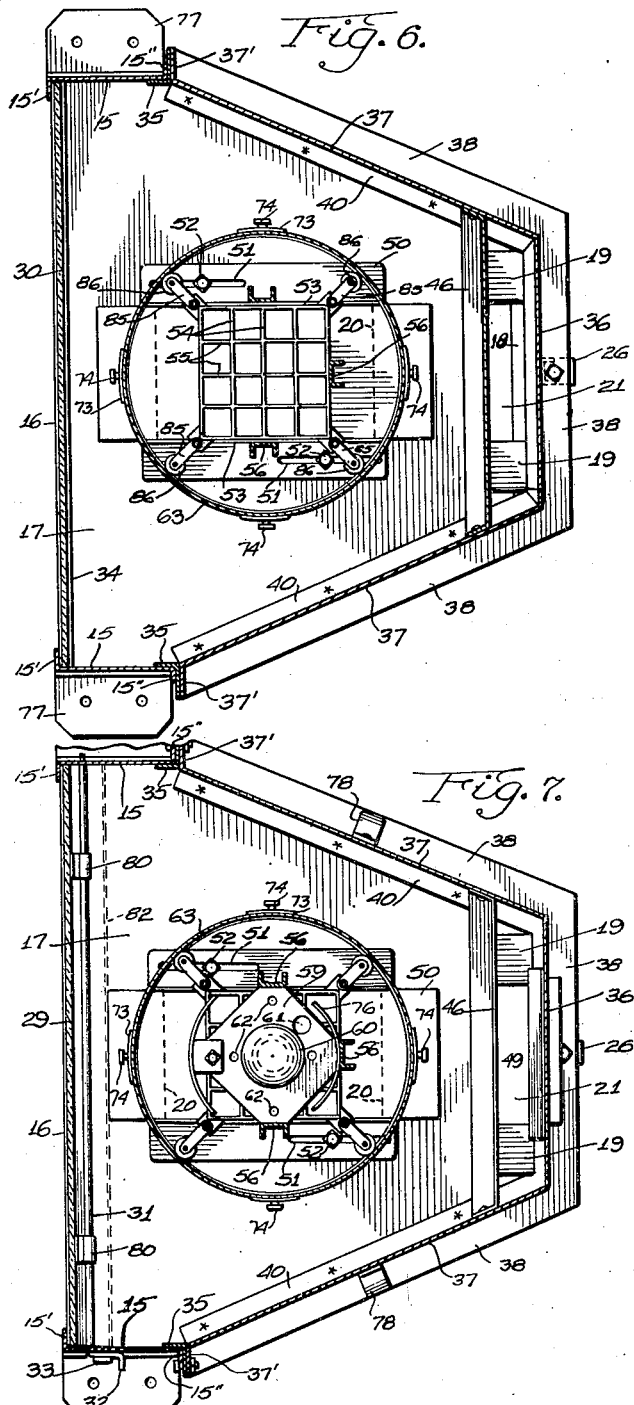
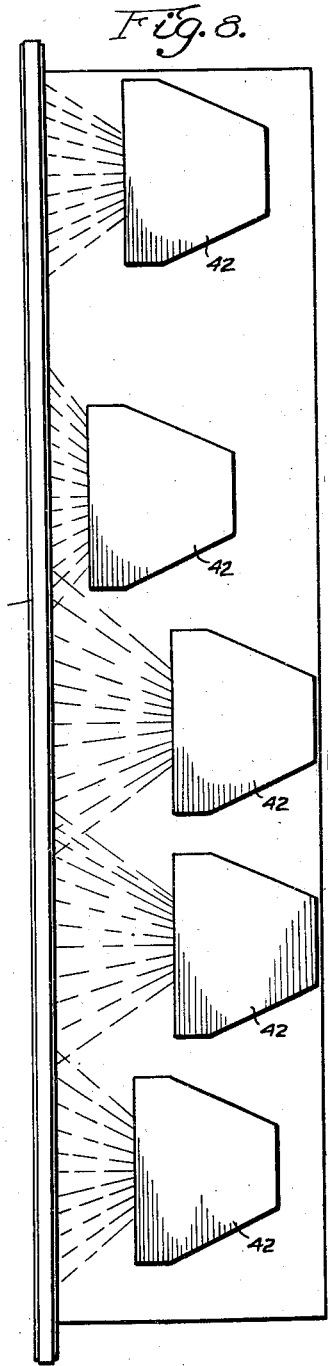

Dec. 15, 1936.  A. B. LEECH  2,064,210
APPARATUS FOR PRODUCING ILLUMINATED MOTION EFFECTS
Filed May 16, 1935  4 Sheets-Sheet 1
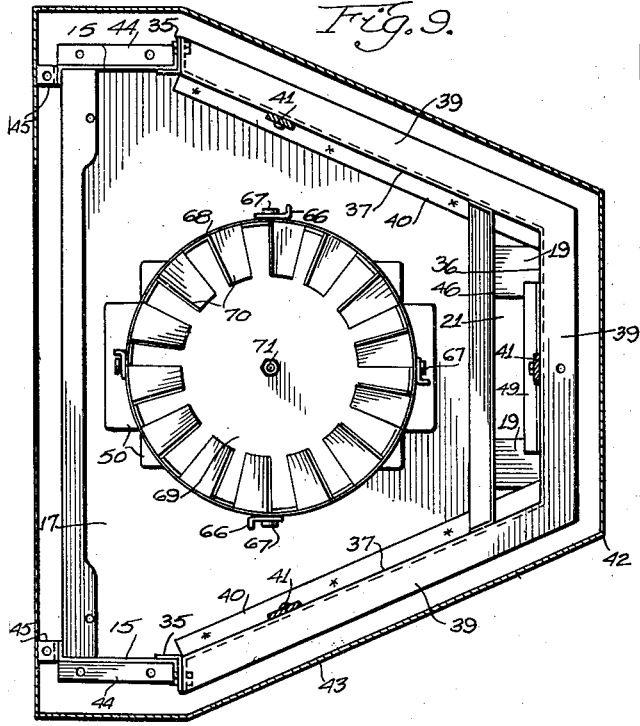
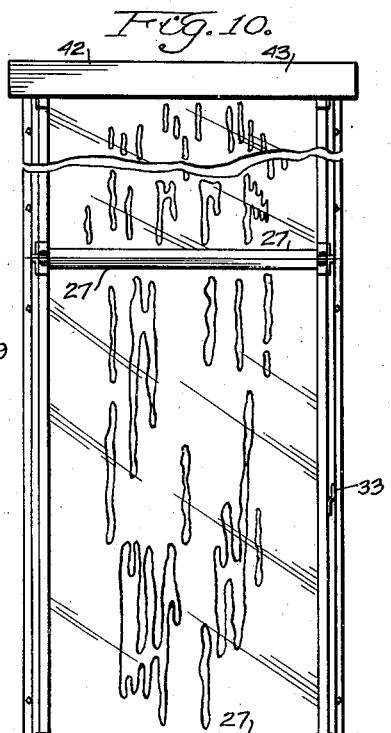
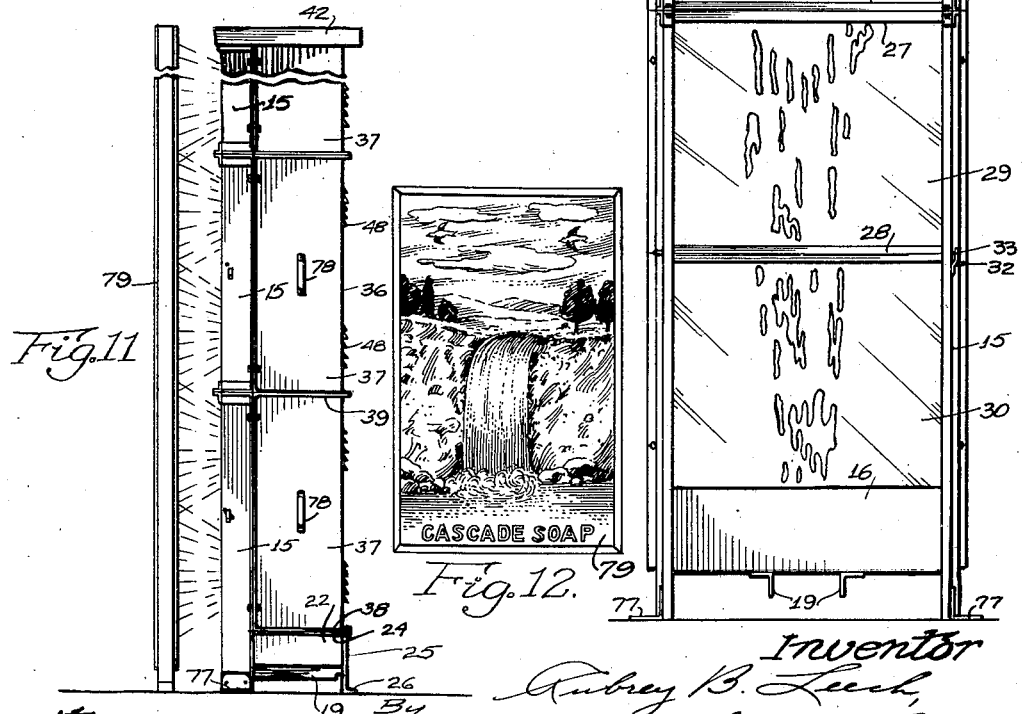

Patented Dec. 15, 1936

2,064,210

UNITED STATES PATENT OFFICE 2,064,210

APPARATUS FOR PRODUCING ILLUMINATED MOTION EFFECTS

Aubrey B. Leech, Chicago, Ill.

Application May 16, 1935, Serial No. 21,841

11 Claims. (Cl. 40—40)

This invention relates to apparatus for producing illuminated motion effects, such, for instance, as rain, snow, fire, smoke, vapor, moving water, operating parts of a machine, etc. An apparatus of this general class is shown in my Patent No. 1,369,751, granted February 22, 1921.

Devices of this general type usually include a housing in which is mounted an incandescent lamp and a rotating screen surrounding the lamp for producing a fluctuating light which is projected through a front translucent picture panel. To obtain the best results, an intermediate stationary screen is interposed usually between the picture panel and the rotating screen.

Devices of this kind have been extensively used for outdoor and indoor advertising, but with such devices heretofore in use it has been difficult to construct signs of especially large dimensions because of the fact that screens of one piece construction have been employed, and in the large sizes the screens are difficult to handle without injury and, when located outdoors, are liable to wind damage. Furthermore, each device must be made in a particular size to fit its particular advertising subject-matter, and the manufacture in a large number of different sizes is expensive.

It has occurred to me that a very considerable economy in the cost of manufacture, greater ease in assembling and repairing, and greater flexibility in use might be effected by building the device in sectional units that could be superposed on each other so as to give, within practical limits, any desired height of sign, and this constitutes one of the important objects of the invention.

Again, heretofore, so far as I am aware, it has been the practice to either include the picture panel in, and as an element of, the housing containing the source of light and the rotating and intermediate screens, or else to mount the picture panel at a fixed and invariable distance in front of the housing. It is known that different effects in both the speed and the spread of the moving light rays on the panel can be secured by varying the distance between the panel and housing, and, with a view to readily obtaining these different effects, another feature of the invention resides in a construction wherein the panel and housing are relatively shiftable toward and from each other. This is especially useful and advantageous where a comparatively long panel contains a picture longitudinally spaced parts of which are to exhibit different moving light effects. By placing a plurality of housings behind, and at different distances from, the panel, this effect may be satisfactorily obtained.

Other objects of the invention are, to provide a construction permitting the use of one or more sections according to the size of the apparatus desired for any particular display, to provide a construction affording easy and quick assembling and disassembling of the sectional units, to provide a construction permitting adjustment of the lamp and revolving screen toward and from the intermediate screen, to provide a construction affording an even and uniform flow of heated air upwardly through the rotating cylindrical screen to and through the usual fan motor from which the cylindrical screen is suspended, to provide an improved lamp and revolving screen supporting structure, and to provide a housing for the cylindrical screen that will provide the proper ventilation of the housing and will guard the cylindrical screen against the impact of wind and disturbing drafts of air.

Still other objects and attendant advantages of the invention will be apparent to persons skilled in the art from the following description, taken in connection with the accompanying drawings, in which I have illustrated one practical and approved embodiment of the principle, and wherein:

Fig. 1 is a front elevation, partly broken out and in vertical section, of a single unit device such as forms the bottom section of a multiple unit device equipped with two (upper and lower) intermediate screens.

Fig. 2 is an elevation, partly in vertical section, of the rotary cylindrical screen used in the apparatus of Fig. 1.

Fig. 3 is a side elevation, partly in vertical section, of the screen suspension device and its fan motor.

Fig. 4 is a vertical section on line 4—4 of Fig. 1, with parts of the screen and its suspension means appearing in elevation.

Fig. 5 is a front elevation, broken out in the top section, of the assembled lamp and reflector support of a multiple unit device.

Figs. 6 and 7 are cross sections on the lines 6—6 and 7—7 respectively of Fig. 4.

Fig. 8 is a top plan view of a wide picture panel and a plurality of devices for producing illuminated motion effects located at varying distances from and behind the panel.

Fig. 9 is a cross section on the line 9—9 of Fig. 4.

Fig. 10 is a front elevation of an apparatus employing three relatively superposed units or sections, the top unit being broken out between its upper and lower ends.

Fig. 11 is a side elevation, on a reduced scale, of the multiple section device shown in Fig. 10, with a fixed picture panel disposed in front of and in proper relation thereto to secure an overlapping of the light rays from the several sections.

Fig. 12 is a front elevation, on a reduced scale, of a typical form of picture panel.

Describing first the housing or casing of the apparatus, this, as indicated in Figs. 10 and 11, may be made in a plurality of relatively superposed sections adapted to be secured to each other. These sections are mainly constructed of sheet metal, and describing first the lowest section or unit shown in Figs. 1, 4, 6, 7 and 9, 15 designates each of a pair of vertical side walls that rest on the floor, as shown in Fig. 4, and are connected slightly above their lower ends by a low front wall or plate 16. Continuous with this front plate 16 is a bottom plate 17 having the general form shown in Figs. 6 and 7. Referring to Fig. 4, the plate 17 at its rear end is formed with a depending angle flange 18 that stiffens it transversely, and also forms a support for the rear ends of a pair of angle bars 19 that underlie the bottom plate 17 and prevent dishing of the plate under the superposed weight. The front ends of the angle bars 19 are spot welded or otherwise secured to the plate 17. The plate 17 is formed with a central wide main flue admission port 20 and with a rear auxiliary port 21, both ports being for the upflow of air. Also, spot welded or otherwise secured to the lower portions of the vertical side walls 15 are rearwardly extending convergent side walls 22 connected by a rear end wall 23. The upper edges of the walls 22 and 23 have outwardly directed flanges 24, the flange of the rear wall 23 resting upon a leg 25 that has a foot 26 resting on the floor. The lower edge portion of the wall 23 is bent inwardly and spot welded to the angle flange 18 of the floor 17, as shown in Fig. 4.

As shown in Figs. 1, 6 and 7, the vertical side walls 15 are formed with an inwardly directed front flange 15' and an outwardly directed rear flange 15''. The flanges 15' are connected at their upper end by a cross bar 27; and, where the unit is provided with a pair of intermediate screens instead of a single intermediate screen, a transverse screen-supporting bar 28 extends between the walls 15, said bar, as shown in Fig. 4, having a seat for the lower edge of the upper screen 29, and an abutment for the upper edge of the lower screen 30. The bar 28 is secured in place by means of a long pin or rod 31 that extends through a sleeve on the inner side of the bar and through holes in the walls 15, the pin having an offset handle 32 that, as shown in Fig. 7, can be swung behind a catch 33 on the wall 15 to lock the pin against escape. As shown in Fig. 4, the upper edge of the front wall 16 is equipped with a suitable seating strip 34 for the lower edge of the glass 30, and the top bar 27 provides an abutment for the top edge of the upper glass 29.

Spot welded or otherwise attached to the walls 15 and their flanges 15'' are angle bars 35 (Figs. 6 and 7), the outwardly directed limbs of which constitute in effect flanges of the walls 15 for the attachment of the rear section of the housing. The foregoing constitutes in the main the front and bottom section of the housing or casing of the lowest unit. The rear section of the housing comprises, as best shown in Figs. 6 and 7, a rear wall 36 and flaring side walls 37, the latter being formed with vertical flanges 37' that, as clearly shown in Figs. 6 and 7, register with the angle bars 35 and are bolted to the latter. The lower ends of the walls 36 and 37 are formed with outwardly extending flanges 38 which, as shown in Fig. 4, rest upon and are bolted to the flanges 24. The upper ends of the walls 36 and 37 are formed with similar outwardly extending flanges 39 that register with and are bolted to corresponding bottom flanges of the next superposed section. On the lower edges of the side walls 22 of the base section are inwardly directed flanges 40 (Fig. 6) to which the underlying edge portions of the floor 17 are spot welded. To the upper portions of the rear and side walls 36 and 37 are attached angle brackets 41 that serve to support a cap 42, this latter being formed with a depending flange 43 deep enough to extend below the top edge of the housing unit.

Referring once more to the front section of the housing, to the outer side of each wall 15 and its front flange 15' are attached angle brackets 44 and 45 respectively that are designed to register with corresponding angle brackets on the lower end of the next superposed unit, the registering flanges of the two brackets being bolted together.

Referring to Figs. 4, 6 and 7, mounted on the floor 17 and attached at its vertical edges to the side walls 37 is a guard plate 46 that, in association with the rear wall 23 of the base and the rear wall 36 of the rear housing section, provides a flue for air flowing upwardly through the port 21 in the floor to remove excess heat and guard the lower end of the rotary screen from disturbance by such up flowing air. In the rear wall 36 of the rear housing section are formed upper and lower series of openings 47 guarded by louvres 48, said openings forming an exit for warm air in the housing surrounding the revolving screen. Guard plates 49 overlie the openings 47 to shield the rotary screen from the impact of wind blowing through the holes 47 in the case of outdoor installations.

From Figs. 10 and 11 it will be apparent that, in the case of a multiple section housing, the sections above the lowest are substantial duplicates of that portion of the lowest section above the front wall or plate 16, each of the upper sections being provided at its lower end with a cross bar 27 that registers with and rests on the cross bar 27 at the top of the next underlying section, as clearly shown in Fig. 10.

Turning now to a description of the light and revolving screen structure and support for the latter within the housing, slidably mounted on the floor 17 is a base plate 50, opposite side portions of which are slotted as shown at 51 to receive clamp bolts 52, by which the base plate may be bodily adjusted toward and from the intermediate screen 29, 30, and secured in adjusted position. Between and secured to a pair of side walls 53 on the base plate 50 is mounted an air draft structure comprising a number of rectangularly intersecting walls 54 and 55, as shown in Fig. 6, creating, in the instance shown, a group of sixteen separate flues for the up flow of air through the opening 20, it being noted that the opening 20 is long enough to serve in all adjusted positions of the flue structure. Mounted on the base plate 50 are three channel bar uprights 56 that support at their upper end a plate 57 (Fig. 4) in which latter is mounted centrally a bearing block 58. Secured to and between the channel bar uprights 56 are plates 59 (Fig. 7), each one of which forms a support for an electric lamp 60. The plates 57 and 59 are structural duplicates and each may be formed with a hole 61 for the passage of air therethrough, and with a group of smaller holes 62 whereby a pair of top and bottom plates 57 may also serve, when bolted together, to connect a lower unit to the next superposed unit, as indicated in Fig. 5, the bottom plate 57 of each section above the lowermost having a central hole to fit down over the bearing 58 of the next underlying section.

63 designates as an entirety a revolving cylindrical screen section that encircles the lamps and their supporting frame work. This screen is equipped on its upper end with an internal collar 64 to which are riveted external plates 65 (Fig. 2) carrying pivoted hooks 66 that are engageable with lateral pins 67 on the fan motor device shown in detail in Fig. 3, this device comprising a ring or band 68 encircling and secured to a disc 69 from which a plurality of inclined blades or vanes 70 are cut and bent up, said blades, when struck by the rising stream of hot air created by the lamp 60, causing the screen suspended therefrom to rotate. The fan motor is pivotally supported by a pointed pivot pin 71 mounted in the disc 69 and stepped on the bearing 58, as clearly shown in Fig. 4. The screen 63 is of a length such that its lower end extends somewhat below the upper end of the flue structure, so that all of the air flowing upwardly through the latter is directed into the cylindrical screen and passes through and operates the fan motor, the air escaping thence beneath the cap 42 through the annular space between the flange 43 of the cap and the flange 39 of the housing.

One revolving screen cylinder is provided for each unit, and when several units are superposed, as indicated in Figs. 10 and 11, the screens therein may be readily connected endwise to each other. For this purpose the lower end of each revolving screen cylinder is supplied with an internal metal collar 72 (Fig. 2) secured to the screen by external plates 73 split riveted thereto but removable from the screen cylinder, each plate carrying a lateral pin 74. The collar 64 has a slightly tapered upward extension 75 adapted to telescope within and center the bottom collar 72 of the next superposed cylinder section, the two being securely connected by swinging the hooks 66 into engagement with the pins 74. In this way, two, three or more cylinder sections may be readily connected up to function simultaneously in the case of a tall sign. It will also be noted that the supporting brackets 41 of the cap 42 may be applied to the top section of the housing whether the latter be a single unit as shown in Figs. 1 and 4 or a multiple unit as indicated in Figs. 10 and 11.

Behind each of the lamps 60 and stepped on the plate 59 is a removable reflector 76, which may be used or omitted as desired.

For greater stability and secure attachment of the apparatus to the floor, the lower ends of the vertical side walls 15 may have attached thereto angle bracket feet 77 (Figs. 6 and 7) apertured for the passage of fastening screws.

Suitable handles 78 on the outer sides of the side walls 37 facilitate the handling of the sectional units in the building up or taking down of the structure.

As indicated in the drawings, each revolving screen section 63 is painted or otherwise marked with oblique or other lines to render it partially opaque and partially transparent; and the same is true of the intermediate screen sections 29 and 30; the markings varying according to the character of the moving light effect to be obtained on the picture panel, as is well understood in the art.

In front of and at a suitable distance from the fluctuating light projector hereinabove described is a fixed picture panel indicated at 79 in Figs. 8, 11 and 12. This panel is painted or otherwise ornamented with at least the outlines of one or more pictures which are to be presented to the eye as in motion, all as well understood in the art.

The moving light effect can be still further varied by more or less changing the angle of the intermediate screen or screen sections 29 and 30, as shown in Fig. 4. For this purpose the top edge of the screen 30 may be held vertical by spring clips 80 attached to the division bar 28, as shown in Figs. 4 and 7; and by means of upper, intermediate and lower spring brackets 81, 82 and 83, the glass panels may readily be shifted to either of the two inclined positions represented by dotted lines in Fig. 4, the brackets bending sufficiently to permit the insertion of the panels. Since the use of these stop bars for purposes of varying the inclination of the screen sections is optional, their presence is indicated in the drawings by dotted lnes.

As shown in my former Patent 1,369,751 hereinabove referred to, it has heretofore been proposed to apply to the front side of the lamp bulb vertical opaque strips, the function of which is to create a moving light effect in a vertical direction but without any waving effect. I have found that this same effect may be produced in a slightly different manner by mounting on the lamp supporting plate 59 an auxiliary screen 84 supplied with vertical opaque stripes.

The operation of changeable exhibitor apparatus of this type is so well understood that a detail description of the operation is unnecessary. One important advantage of the apparatus shown and described herein is, of course, its capability of providing relatively large and small signs with ease and facility of assembling and disassembling and repairing parts, owing to its sectional character and the fact that the several sections are substantial duplicates of each other. Fig. 8 illustrates the wide range of fluctuating light effects that may be secured on a single wide panel 79 by employing behind the panel a plurality of independent light projectors, each of which may be set at any distance from the panel to obtain the desired light effect afforded by its particular distance from the panel. Fig. 8 also illustrates how a continuous moving light effect on the panel may be obtained by so spacing the projectors laterally that the light rays from each projector will overlap the corresponding light rays from adjacent projectors. This feature of making the light projector bodily shiftable toward and from the picture panel, and the sectional character of the light projector illustrate the great flexibility of the apparatus for obtaining a wide range of fluctuating light effects, and also contribute to economy of manufacture and installation, since one, two or more sections may be taken and used from the same stock, to serve picture panels of widely varying heights and widths.

The described means for controlling the flow of heated air through the housing also insures a stronger and more uniform impulsion by the fan motor, and the ventilation devices afford ample escape for the heated air after it has done its work and at the same time prevent lateral disturbance of the revolving screen cylinder by reason of wind effects in outdoor installations. In this connection, in the case of outdoor installations, I preferably mount on the four corners of the multiple flue draft device a group of radial arms 85 (Figs. 6 and 7) carrying at their outer ends lightly pivoted rollers 86, which slightly clear the inner surface of the revolving screen when the latter is perfectly vertical. In case, however, that the screen shifts laterally under a draft effect, or for any other reason, such lateral shift is limited to a negligible amount by contact of the screen with the rollers 86.

By the term "picture panel" as used herein is meant a panel having thereon a picture, pattern, symbol or the like, the parts or features of which are traversed by the continuously shifting light rays directed thereon in such a manner as to give illuminated movement effects. Such a picture panel is shown at the left of Fig. 1 of my Patent No. 1,369,751. And by the term "intermediate screen" as used herein is meant a screen having opaque and translucent portions for respectively occluding and transmitting the light rays. Such an intermediate screen is shown at 8 in Fig. 1 of my aforesaid patent.

While I have shown and described one practical and approved embodiment of the invention which may be largely made of sheet metal stampings and standard bar forms, the invention is not limited to the specific details disclosed, but its subject matter and scope may be ascertained by reference to the following claims.

I claim:

1. Apparatus for producing illuminated motion effects comprising, in combination, a picture panel, and a housing containing a source of light, a revoluble cylindrical screen having opaque and translucent portions surrounding said source of light, and an intermediate screen having opaque and translucent portions forming a wall of said housing and located between said cylindrical screen and said panel, said panel and housing formed as independent spaced units and capable of relative shift of position toward and from each other.

2. Apparatus for producing illuminated motion effects comprising, in combination, a fixed picture panel, and a housing containing a lamp, a revoluble cylindrical screen having opaque and translucent portions surrounding said lamp, and a flat intermediate screen having opaque and translucent portions forming a wall of said housing and located between said cylindrical screen and said panel, said panel and housing formed as independent spaced units, and said housing being bodily shiftable toward and from said panel.

3. Apparatus for producing illuminated motion effects on a picture panel, comprising a plurality of separable superposed sections, each section comprising a housing including a source of light and a revoluble cylindrical screen having translucent and opaque portions surrounding said source of light, means for connecting adjacent screens endwise to each other, and means for pivotally suspending the topmost of the connected screens.

4. Apparatus for producing illuminated motion effects on a picture panel, comprising a plurality of separable superposed sections, each section comprising a housing including a source of light, a revoluble cylindrical screen having translucent and opaque portions surrounding said source of light, and a fixed screen having translucent and opaque portions, means for connecting adjacent cylindrical screens endwise to each other, and means for pivotally suspending the topmost of the connected screens.

5. Apparatus for producing illuminated motion effects on a picture panel, comprising a plurality of separable superposed sections, each section comprising a housing including a source of light, a revoluble cylindrical screen having translucent and opaque portions surrounding said source of light, and a fixed flat screen having translucent and opaque portions and constituting a wall of said housing, means for connecting adjacent cylindrical screens endwise to each other, and means for pivotally suspending the topmost of the connected screens.

6. Apparatus for producing illuminated motion effects on a picture panel, comprising a plurality of superposed sections each comprising a housing including a lamp and a revoluble cylindrical screen having translucent and opaque portions surrounding said lamp, said housings formed with mating flanges on their ends whereby they may be bolted together, means for connecting adjacent screens endwise to each other, and means for pivotally suspending the topmost of the connected screens.

7. Apparatus for producing illuminated motion effects on a picture panel, comprising a housing having a floor formed with an air upflow port, an intermediate screen forming a wall of said housing, a supporting structure on said floor carrying a lamp and a revolving cylindrical screen surrounding said lamp, and a multiple flue air draft structure on said floor overlying said air inflow port and extending within the lower end of said cylindrical screen.

8. Apparatus for producing illuminated motion effects on a picture panel, comprising a housing having a floor formed with an air upflow port, an intermediate screen forming a wall of said housing, a supporting structure on said floor carrying a lamp and a revolving cylindrical screen surrounding said lamp, and a multiple flue air draft structure on said floor overlying said air inflow port and extending within the lower end of said cylindrical screen, said supporting structure and said air draft structure both being bodily adjustable toward and from said intermediate screen.

9. Apparatus for producing illuminated motion effects on a picture panel, comprising a housing having a floor formed with a main air upflow port and an auxiliary air upflow port, an intermediate screen forming the front wall of said housing, a supporting structure on said floor carrying a lamp and a revolving cylindrical screen surrounding said lamp, a multiple flue air draft structure on said floor overlying said main air inflow port and extending within the lower end of said cylindrical screen, and an upright guard plate on said floor between said main and auxiliary air upflow ports.

10. In an apparatus of the character described, a sectional lamp and revolving screen supporting structure, each section comprising a plurality of uprights, top and bottom plates between and connecting said uprights, said top plate carrying a bearing for a screen supporting pivot pin, and an intermediate plate for supporting a lamp; the bottom plate of each section above the lowermost adapted to rest on and be secured to the top plate of the next underlying section.

11. In an apparatus of the character described, the combination of an open top housing, a fixed lamp and revolving screen supporting structure in said housing having at its upper end a pivot pin bearing, a fan type screen motor having a central pivot pin stepped on said bearing, a revolving screen, separable connections by which said screen is suspended from said motor, and a cap mounted on the upper end of said housing, said cap having a depending flange surrounding the top of said housing with clearance for the escape of air passing through said motor.

AUBREY B. LEECH.